United States Patent [19]

Beer et al.

[11] 4,223,260
[45] Sep. 16, 1980

[54] STEPPER MOTOR DRIVE APPARATUS

[75] Inventors: Larry D. Beer, Romeo; James M. Slicker, both of Detroit, Mich.

[73] Assignee: The Valeron Corporation, Troy, Mich.

[21] Appl. No.: 938,431

[22] Filed: Aug. 31, 1978

[51] Int. Cl.² ............................................. H02K 37/00
[52] U.S. Cl. ..................................... 318/696; 318/138
[58] Field of Search ....................... 318/696, 138, 685

[56] References Cited

U.S. PATENT DOCUMENTS

| | | | |
|---|---|---|---|
| 4,081,736 | 3/1978 | Leenhouts | 318/696 |
| 4,121,144 | 10/1978 | Leenhouts | 318/696 |
| 4,127,801 | 11/1978 | Leenhouts | 318/696 |
| 4,164,697 | 8/1979 | Everett | 318/696 |

*Primary Examiner*—B. Dobeck
*Attorney, Agent, or Firm*—Krass & Young

[57] ABSTRACT

Apparatus is disclosed for converting input step and direction commands from an external control source into stator winding drive current signals for a permanent magnet stepper motor. A translator circuit, having inputs coupled to the external control, generates sequential stator winding pulse enabling signals for transmission to a chopper-controlled power drive circuit. The chopper control features the sharing of a single chopper power switch by pairs of stator windings. The power drive circuit provides a winding current path to a reverse voltage supply upon initiation of winding current turn-off to enhance switching speed. A dual level current reference is generated in a current regulator circuit and compared with instantaneous stator winding currents to control the conduction states of the chopper power switches. Dual reference levels are established for idle versus accelerating or decelerating motor states, respectively. The translator circuit includes means for inhibiting chopper power switch conduction independently of the current regulator reference level comparison whenever the translator is switching drive current among stator windings, thereby decreasing power dissipation due to transients.

8 Claims, 4 Drawing Figures

4,223,260

STEPPER MOTOR DRIVE APPARATUS

CROSS REFERENCE TO RELATED APPLICATIONS

This invention is related to U.S. Ser. No. 938,432 entitled CONTROLLER FOR TOOL COMPENSATION SYSTEM by Murray, having the same filing date and assignee as the present invention.

BACKGROUND OF THE INVENTION

1. Field of the Invention

The invention generally pertains to apparatus for supplying electrical energy to synchronous stepper motors. More specifically, the invention relates to a chopper controlled drive circuit for a permanent magnet step motor.

2. Description of the Prior Art

The step motor is a synchronous machine designed to rotate its rotor a predetermined amount in response to each electrical pulse, or step command, received by its drive circuit. The rotation is effected by delivering appropriate drive currents in response to received step commands to sequentially energize selected stator windings of the motor to force the axis of the air gap between rotor and stator poles into alignment. The portion of the motor drive furnishing the proper drive current switching sequence among the stator windings is commonly referred to as the translator section.

A known prior art approach utilizes two windings on each stator section of equal turns but of opposite winding sense (e.g., so-called "bifilar" windings) to effect reversal of magnetic flux in stator pole pieces without the need for two separate voltage sources of opposite polarity.

Further details of step motor types and typical prior art approaches to providing current drives thereto are found in a series of technical papers available from the Superior Electric Company, Bristol, Conn. 06010.

In a typical bifilar wound, permanent magnet rotor step motor, two bifilar wound coils (four coils total) are alternatively switched to provide stepping action. It is a further known technique to attempt to optimize step motor performance by furnishing a substantially constant current to stator windings in the course of energizing the motor. One such known approach is the so-called chopper driver. The typical chopper driver for a step motor utilizes a current sensor at the stator windings whose output is compared to a reference level. When stator current exceeds the reference level the chopper operates to interrupt the stator current supply until coil current decays to a level just below the reference, at which time the stator winding current source is reactivated.

Prior chopper controlled drive arrangements have raised problems of motor heating and heating of drive components due to relatively high chop rates, slow commutating action due to inductive loading during stator winding phase switching, and transient current spikes causing excessive power dissipation when switching between phases.

SUMMARY OF THE INVENTION

It is therefore an object of this invention to overcome prior art deficiencies of drive circuits for step motors in an economically feasible manner.

Specifically, it is an object of this invention to provide a drive arrangement for a permanent magnet step motor that utilizes a relatively low chopper operating frequency and generates negligible heat from undesirable switching transients, while enabling fast motor acceleration and reliable motor operation at relatively high stepping speeds.

Apparatus is disclosed for converting stepper motor input step and direction commands from an external control source into properly sequenced stator winding drive current signals whose amplitudes are regulated by a chopping action controlled by a dual level current reference control means. A translator circuit portion of the apparatus includes means for inhibiting chopper power switch conduction independently of the current reference control means whenever switching of drive current between stator windings is initiated, thereby eliminating harmful transients.

It is a feature of this invention that stator phase winding pairs economically share a common chopper transistor.

It is a further feature of this invention that a relatively low chop rate results from the inherent design of the motor drive apparatus, producing relatively low heat dissipation in the chopper power switching devices.

Yet another feature of the invention is the provision of an additional current path to a reverse potential of higher magnitude during the phase current commutation interval thereby allowing fast commutation between stator phases during stepper motor translation.

BRIEF DESCRIPTION OF THE DRAWING

These and other objects and features of the invention will become apparent upon a reading of a description of a preferred embodiment taken in conjunction with the drawing in which.

DETAILED DESCRIPTION

Figure 1:
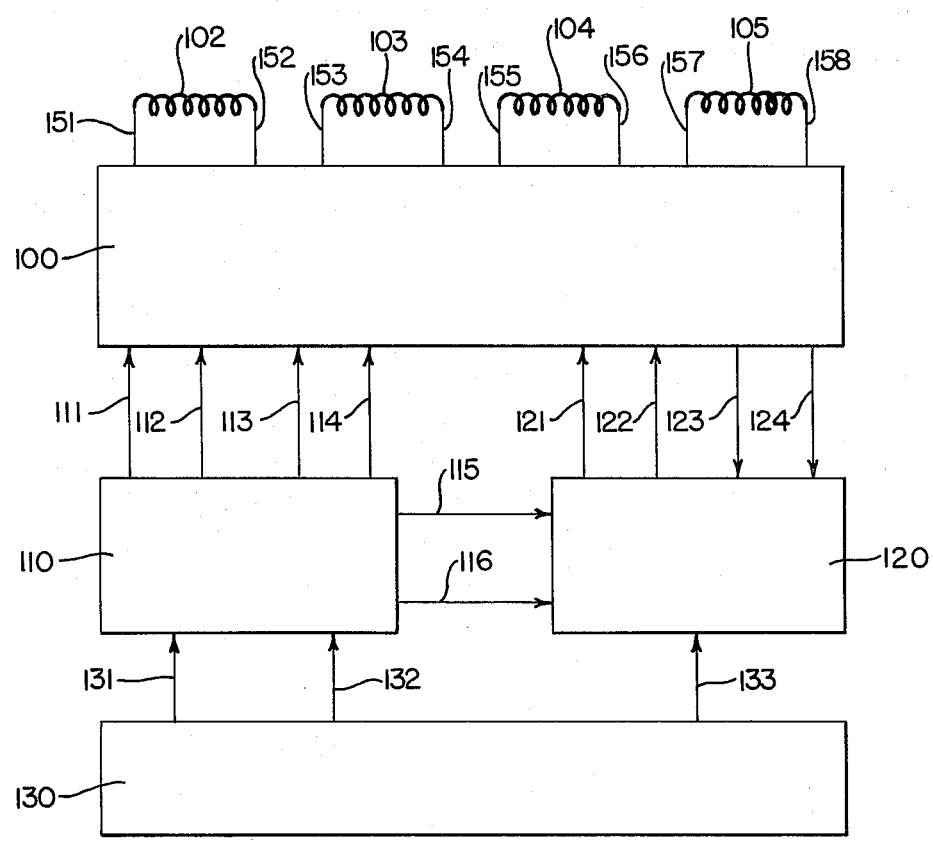
FIG. 1 is a functional block diagram of a stepper motor drive system arranged in accordance with the principles of the invention.

Referring to FIG. 1, there is shown a block diagram of a stepper motor drive designed in accordance with the principles of the invention. Power drive current supply means 100 is coupled to four motor stator windings 102-105. Power drive means 100 is controlled by stator winding phase enable leads 111-114 coupling sequencing signals from translator circuitry 110 and chopper enable leads 121 and 122 coupling signals from reference control means 120. Driver means 100 includes stator current level monitoring means associated with each pair of stator windings 102, 103, and 104, 105 whose respective outputs 123 and 124 are coupled to reference control means 120.

Two chopper inhibit signals are coupled from translator 110 to reference control 120 via paths 115 and 116.

The drive arrangement of the instant invention is under the control of an external source 130 of stepper motor command signals. Path 131 from external source 130 carries a direction-indicating logic signal, path 132 carries a clocked step command pulse train for the stepper motor, and path 133 couples a logic signal indicating which of two reference current levels are to be used by reference control 120 in determining the switching states of the chopper switches in power drive 100.

External source 130 could, for example, be comprised of a micro-computer-based controller such as that disclosed in the above copending application identified in the Cross Reference to Related Applications.

Figure 2:
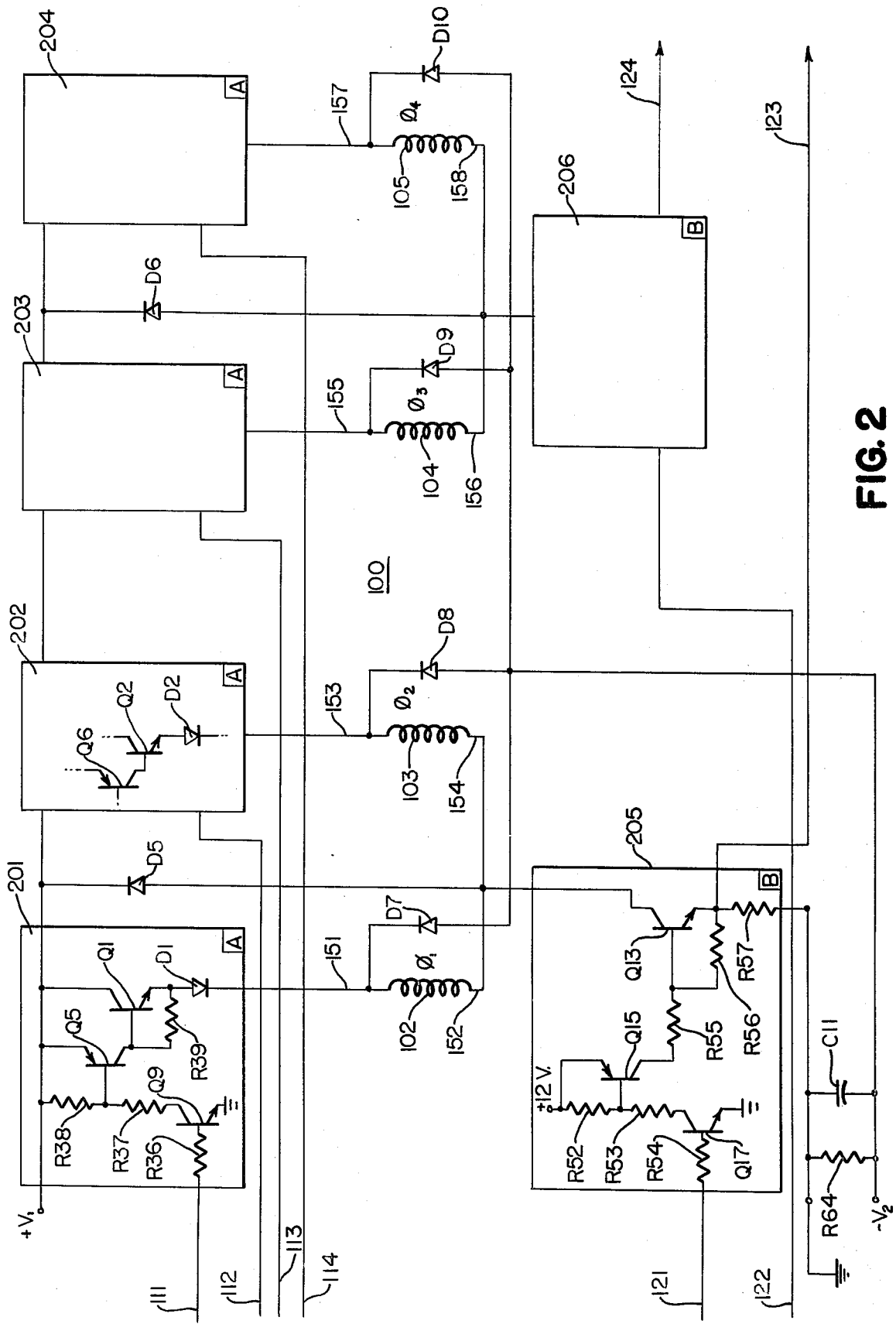
FIG. 2 is a more detailed schematic of the circuitry of power drive means 100 of FIG. 1.
Figure 3:
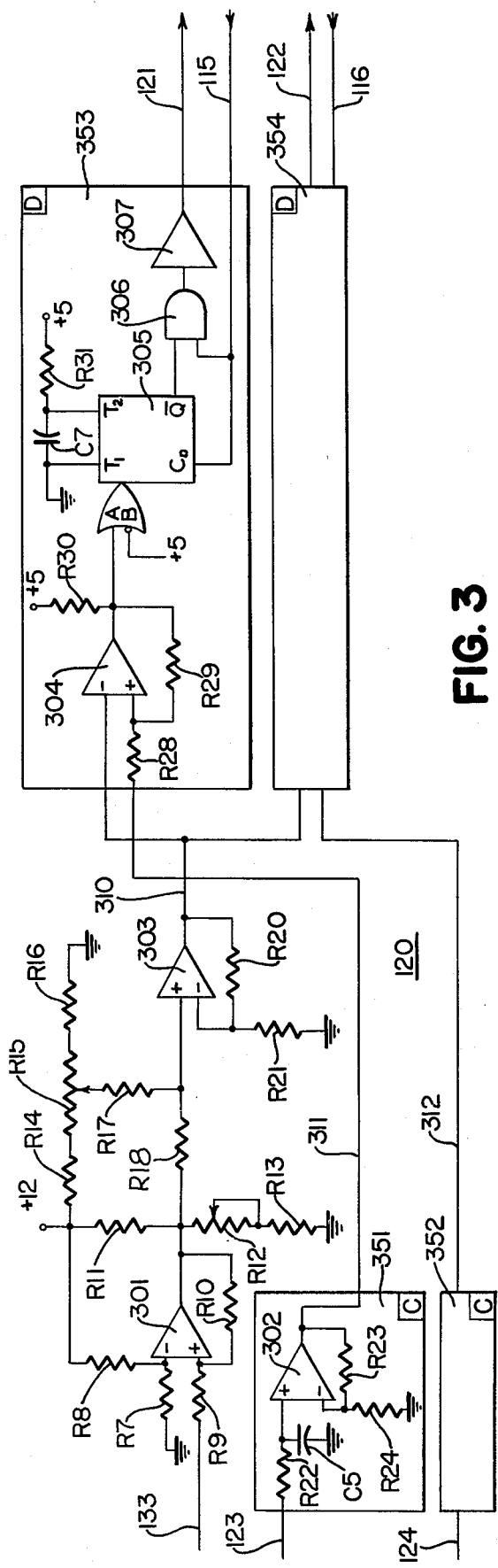
FIG. 3 is a more detailed schematic of the circuitry of current reference control means 120 of FIG. 1.
Figure 4:
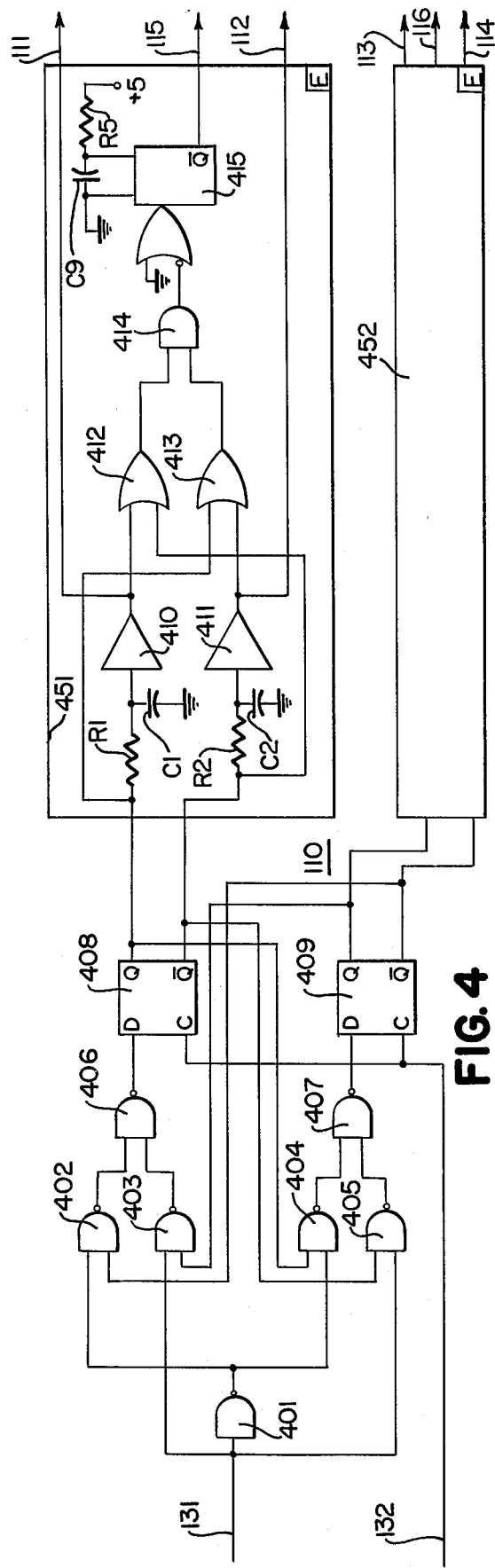
FIG. 4 is a more detailed schematic of the circuitry of translator 110 of FIG. 1.

It should be noted with reference to subsequent discussions of FIGS. 2-4, that identical reference numerals to those of FIG. 1 are used for lead designations in the detailed circuit depictions of FIGS. 2-4. Hence, the system block diagram of FIG. 1 may be used as a guide to the source or destination of such leads shown in the other figures of the drawings.

POWER DRIVE—FIG. 2

A more detailed schematic of the power drive 100 of FIG. 1 is set forth in FIG. 2. Stator phase windings 102 ($\phi_1$), 103, ($\phi_2$), 104 ($\phi_3$), and 105 ($\phi_4$) are shown in schematic form detached from the motor stator pieces on which they are physically wound. One typical motor usable with the drive circuit of this invention is a model M092-FC301, commercially available from the Superior Electric Company.

To avoid repetitive detail in FIGS. 2-4, functional blocks with similar lettering in their lower right-hand corner, by convention, are assumed to contain the same components depicted in one representative functional block. Hence, detailed structural descriptions will be given with reference only to those representative functional blocks shown in detail in FIGS. 2-4.

Referring to the power drive apparatus of FIG. 2, motor stator windings 102-105 respectively corresponding to phases 1-4 ($\phi_1$-$\phi_4$) are switched in the so-called full step mode by a power transistor Q1 in respective functional blocks 201-204. Phases $\phi_1$ and $\phi_2$ share a chopper switch transistor Q13 while Phases $\phi_3$ and $\phi_4$ share a corresponding chopper switching device (not shown) in functional block 206.

Drive current for $\phi_1$ flows from positive supply $+V_1$ through the collector-emitter circuit of Q1 through protection diode D1, through winding 102, through the collector-emitter circuit of chopper transistor Q13, through resistor R57 to ground.

Transistor Q1 is enabled by a logic one signal at path 111 rendering transistors Q9 and Q5 conductive. Resistors R36, R37, R38, and R39 are bias elements for the transistors of functional block 201.

Chopper transistor Q13 is enabled by a logic one signal at path 121 rendering transistors Q17 and Q15 conductive. Resistors R52-R57 are bias elements for the transistors of functional block 205.

Diode D5, coupled between the junction of windings 102 and 103 and source $+V_1$, is used during switch off of transistor Q13 for a purpose to be explained below. A filter network comprised of resistor R64 and capacitor C11 is coupled between negative voltage source $-V_2$ and ground.

As an example of chopping action and power drive to winding 102, during the "on" time of chopper switch Q13 and phase enabling transistor Q1, the $\phi_1$ current increases rapidly due to the low impedance presented from ground to source $+V_1$ via the above-described stator current path. When, due to $\phi_1$ current exceeding a predetermined threshhold, Q13 is switched off while Q1 remains on, the current path for $\phi_1$ now becomes throiugh the collector-emitter of Q1 via winding 102 and diode D5 back to source $+V_1$. Hence $\phi_1$ current will decay slowly because both sides, 151 and 152, of $\phi_1$ winding 102 are at substantially equal potentials. Such slow current decay permits a relatively low chop frequency and results in reduced heat dissipation in Q13 during chopping, as compared to prior art chopping arrangements.

As an example of current switching, or translation, between stator phase windings, assume $\phi_1$ current is flowing and we wish to switch stator winding current to $\phi_2$ winding 103. To translate, the enable signal is removed from path 111 and a new enabling logic one signal is applied to path 112 by translator 110 (FIG. 1). As Q1 is switched off, the current path for $\phi_1$ winding 102 to the negative voltage supply $-V_2$ via diode D7 causes $\phi_1$ current to decay rapidly allowing fast commutation to phase $\phi_2$. Diode D2 in functional block 202, corresponding to diode D1 of block 201, serves to protect phase enabling transistor Q2 of block 202 from the resulting positive-going voltage spike developed at winding 103 that results from $\phi_1$ current conduction through diode D7.

During the transistion period when transistor Q1 is turning off and its couterpart in functional block 202, Q2, is enabled, chopper transistor Q13 is momentarily turned off until the current through Q1 decays to zero. Such action by transistor Q13 prevents transient current spikes which would occur if windings 102 and 103 were simultaneously conducting current, thereby eliminating excessive heating of the power switching transistors of the drive circuitry of FIG. 2.

Reference Control Means—FIG. 3

FIG. 3 sets forth a more detailed schematic of reference control circuitry 120 of FIG. 1. Again, to avoid repetition, the convention of similarly designated functional blocks, with only one representative block shown in detail, has been used. The structural and functional descriptions below apply equally well to functional blocks not shown in detail.

Reference control 120 determines the appropriate conduction state of chopper switching transistors Q13 of the power drive circuit 120 of FIG. 2 by monitoring the potential developed across Q13 emitter resistor R57 via path 123 and amplifier 302 of FIG. 3, and comparing that potential with a dual level reference signal at comparator 304.

As seen from FIG. 3, path 123 is coupled via a filter network comprised of resistor R22 and capacitor C5 to the noninverting input of amplifier 302. Resistors R24 and R23 are bias and gain adjusting elements configured with amplifier 302 in a manner well known in the art.

The output of amplifier 302 is coupled via path 311 and resistor R28 to a non-inverting input of amplifier 304, which is configured using resistors R28-R30 as a comparator.

The dual level reference is obtained by summing an "idle" current reference developed at the junction of resistors R17 and R18 with a "high" current reference developed at the output of amplifier 301 in response to a logic one signal sent from external controller 130 (FIG. 1) via path 133 and resistor R9 to a non-inverting input of amplifier 301. Resistors R7 through R10 are typically arranged biasing elements for amplifier 301, while resistors R11 through R16 are configured to generate a desired "idle" current reference. A combined reference signal is coupled to an inverting input of comparator 304 via buffer amplifier 303 and its associated biasing elements R20 and R21.

The dual level reference arrangement described above enables use of a low stepper motor drive current level during standstill and a relatively high motor current during acceleration, thereby providing for a more efficient power drain when compared to stepper motor controllers of the prior art.

The chopper enable signals at path 121 are developed using the output of comparator 304 as a triggering signal for monopulser 305. Monopulser 305 may, for example, comprise IC type 14538, commercially available from Motorola, Inc. The time interval of the triggered monpulser outputs (a low-going logic signal at $\overline{Q}$) is determined by the selected values of resistor R31 and capacitor C7.

When the current feedback signal at path 123, for example, exceeds the current chop reference at output 310 of amplifier 303, the output of comparator 304 goes positive to trigger monopulser 305. The monopulser output at $\overline{Q}$ goes low resulting in a chopper disabling signal at path 121 for the duration of the monopulser's active period. The monopulser active period is selected such that sufficient time is provided for the drive current in FIG. 2 to decay below the chop reference thereby resetting comparator 304 of FIG. 3. When monopulser 305 times out, the chopper switching transistors such as Q13 of FIG. 2, again are conductive and the chopper operation cycle continues.

Chopper transistor Q13 of FIG. 2 can alternatively be reset via path 121 due to the action of translator 110 (FIG. 1) producing a negative-going signal at path 115, which will override any pre-existing state of monopulser 305 to disable the corresponding chopper transistor. Such a signal is furnished by the translator at path 115 whenever two phases of stator winding current are being switched. These disabling pulses insure that if a new phase is switched during a chopping "off" state, the chopper circuit will be re-initialized for the newly active phase.

Translator—FIG. 4

Translator 110 of FIG. 1 is shown in more schematic detail in FIG. 4. This section of the system of FIG. 1 generates the proper phase enable sequence for turning the stepper motor in either direction in response to appropriate command signals received from external control 130 via paths 131 and 132. The phase enable signals are generated at paths 111, 112, 113, and 114. In addition, as mentioned above in connection with FIG. 3, chopper inhibit pulses at paths 115 and 116, which re-set the monostables 305 and its counterpart in block 354 of FIG. 3 to inhibit the chopper transistors of FIG. 2 when switching between phases, are generated in translator 110.

The direction-indicating logic signal at path 131 is coupled to an input of inverter 401, a first input of NAND gate 403 and to a first input of NAND gate 405. The output of inverter 401 is coupled to a first input of NAND gate 402 and to a first input of NAND gate 404.

The outputs of gates 402 and 403 are respectively coupled to first and second inputs of NAND gate 406, while the outputs of gates 404 and 405 are respectively coupled to first and second inputs of NAND gate 407.

Clocked step command pulses appearing at path 132 are coupled to a C input of D-type flip-flops 408 and 409. The D input of flip-flop 408 is coupled to the output of gate 406, while the D input of flip-flop 409 is coupled to the output of gate 407. The Q output of flip-flop 408 is coupled to a second input of gate 404, and to one terminal of resistor R1 and a first input to NOR gate 413 of the monopulser control circuitry of functional block 451. The $\overline{Q}$ output of flip-flop 408 is coupled to a second input of gate 405, and to one terminal of resistor R2 and a first input to NOR gate 412 of the monopulser circuitry of block 451.

The Q output of flip-flop 409 is coupled to a second input of gate 403, and to components (not specifically shown) in block 452 corresponding to components in block 451 coupled to the Q output of flip-flop 408. The $\overline{Q}$ output of flip-flop 409 is coupled to a second input of gate 402, and to components (not specifically shown) in block 452 in a manner similar to the connections in block 451 shown to the $\overline{Q}$ output of flip-flop 408.

Signal transitions at the Q outputs of flip-flop 408 are delayed from reaching a second input to OR gate 412 by resistor R1, capacitor C1 and buffer amplifier 410. Signal transitions at the $\overline{Q}$ output of flip-flop 408 are similarly delayed from reaching a second input to OR gate 413 by resistor R2, capacitor C2 and buffer amplifier 411.

The outputs of buffers 410 and 411 respectively additionally provide phase enabling signals to paths 111 and 112.

The outputs of OR gates 412 and 413 are respectively coupled to first and second inputs of AND gate 414, whose output is coupled to provide a negative-going trigger signal to monopulser 415. Monopulser 415 typically may comprise the above-referenced IC type 14538. Normally logic high monopulser 415 ouput $\overline{Q}$ is coupled to path 115. The logic level at path 131 determines one of two possible phase-pair sequences provided by the logic structure of FIG. 4 set forth above.

When a logic one is present at path 131, then the following sequence is effected, each step occurring as a result of a clocked pulse received at path 132:

$$\phi_1\phi_3-\phi_1\phi_4-\phi_2\phi_4-\phi_2\phi_3-\phi_1\phi_3$$

When a logic zero is present at path 131, the above sequence is reversed for opposite motor stepping motion as follows:

$$\phi_1\phi_3-\phi_2\phi_3-\phi_2\phi_4-\phi_1\phi_4-\phi_1\phi_3$$

The symbol $\phi_m\phi_n$ represents current flow in phase windings n and m.

It should be noted that the invention described herein has been illustrated with reference to a particular embodiment. It is to be understood that many details used to facilitate the description of such a particular embodiment are chosen for convenience only and without limitation on the scope of the invention. Many other embodiments may be devised by those skilled in the art without departing from the scope and spirit of the invention. Accordingly, the invention is intended to be limited only by the scope and spirit of the appended claims.

The embodiments of the invention in which an exclusive property or privilege is claimed are defined as follows:

1. In a multiphase stepper motor under control of an external source of motor step and direction commands, a motor drive apparatus for converting the commands into stator winding drive currents, said apparatus comprising:
   power drive means including a plurality of control transistors each associated with a different stator winding, a plurality of chopper transistors each associated with a different pair of the stator windings, the control and chopper transistors operative as connected to enable current flow through a stator winding only when its associated control and chopper transistors are enabled;

reference control means coupled to the external source and the power drive means, said reference control means including a reference level generator, and means for comprising a generated reference level with current flowing in the stator windings and generating conduction state control signals for each chopper transistor in accordance with comparison results; and translator means coupled to the external source, the power drive means, and the reference control means, operative to generate a sequence of enabling signals, to couple the sequence to the control transistors in accordance with commands received from the external source, and said translator means being further operative to generate signals at predetermined times to disable the means for comparing such that the associated chopper transistor is disabled independently of the comparison result.

2. The motor drive apparatus as set forth in claim 1 wherein the power drive means further comprises:
means for establishing substantially equal initial potential levels at both ends of a stator winding whenever its associated chopper transistor is disabled while its associated control transistor remains enabled.

3. The motor drive apparatus as set forth in claim 1 wherein the power drive means further comprises:
a positive DC potential source coupled to a collector electrode of each of the control transistors, an emitter electrode of each control transistor coupled to a first end of different ones of the stator windings, each of the chopper transistors having a collector electrode coupled to opposite ends of a different pair of the windings, each chopper transistor collector electrode further coupled to an anode electrode of an associated diode, the cathode electrode of each associated diode coupled to the positive DC potential source.

4. The motor drive apparatus as set forth in claim 1 wherein the power drive means further comprises means for providing a reverse potential across the stator winding whenever its associated control transistor is disabled.

5. The motor drive apparatus as set forth in claim 1 wherein the power drive means further comprises:
a positive DC potential source, a negative DC potential source, and a plurality of diodes each associated with a different one of the control transistors, the positive source coupled to a collector electrode of each of the control transistors, an emitter electrode of each control transistor coupled to a first end of different ones of the stator windings and to a cathode electrode of the associated one of the diodes, each diode having an anode electrode coupled to the negative DC potential source; and
each of the chopper transistors having a collector electrode coupled to opposite ends of a different pair of the stator windings and an emitter electrode coupled to ground potential.

6. The motor drive apparatus as set forth in claim 1 wherein the reference level generator further comprises:
a first current reference level source having an input coupled to the external source of motor commands for selectively enabling an output of the first reference source;
a second current reference level source having a continuously enabled output; and
means for summing the outputs of the first and second reference sources and presenting the sum to an output of the reference level generator.

7. The motor drive apparatus as set forth in claim 6 wherein the means for comparing further comprises:
a plurality of means for monitoring current being conducted by each chopper transistor and generating an output signal proportional thereto;
a plurality of comparators, each associated with one of the means for monitoring and each having a first input coupled to the reference level generator output and a second input coupled to an output of an associated means for monitoring;
a plurality of monopulsers, each associated with one of the comparators and each having an enabling input coupled to an associated comparator output, and a reset input coupled to the translator means; and
a plurality of logic AND gates, each associated with one of the monopulsers and each having a first input coupled to a normally logic high output of an associated monopulser, a second input coupled to the reset input of the associated monopulser, and an output coupled to an associated chopper transistor of the power drive means.

8. The motor drive apparatus as set forth in claim 7 wherein the translator means further comprises:
means for generating a logic signal for a predetermined time interval whenever current conduction is to be switched from one stator winding to another and for coupling the logic signal to a corresponding one of the reset inputs of the plurality of monopulsers of the means for comparing.

* * * * *